Sept. 28, 1965 G. L. WALKER ETAL 3,208,489
PHILLIPS HEAD SCREW STARTER
Filed Sept. 18, 1962
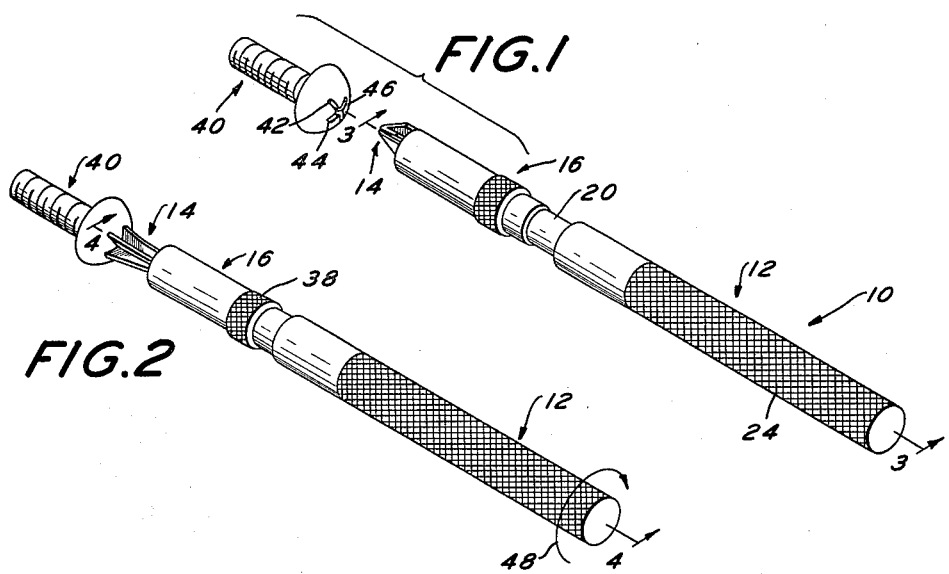
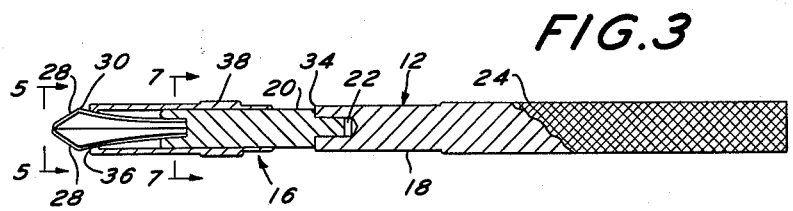
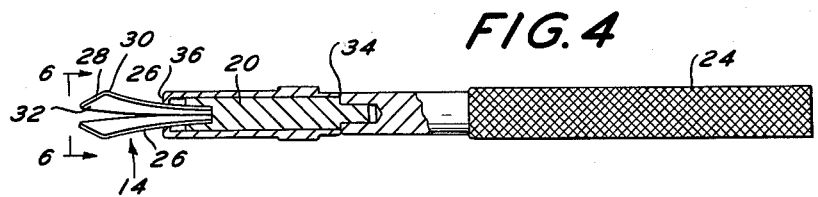
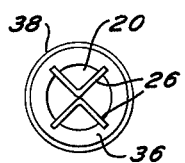
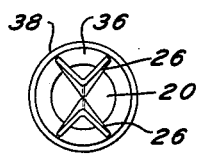
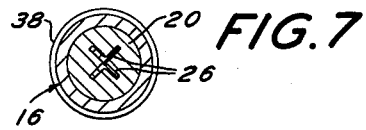
INVENTORS.
GLENN L. WALKER
JAMES L. FILER
BY
Caesar and Rivise
ATTORNEYS.

United States Patent Office 3,208,489
Patented Sept. 28, 1965

3,208,489
PHILLIPS HEAD SCREW STARTER
Glenn L. Walker and James L. Filer, Lapeer, Mich., assignors to Aircraft Specialties, Inc., Lapeer, Mich., a corporation of Delaware
Filed Sept. 18, 1962, Ser. No. 224,315
12 Claims. (Cl. 145—50)

This invention relates to a starter for cross-cut or cruciform slot screws, such as the Phillips head and Reed and Prince screws.

In many operations it has been found extremely difficult, if not impossible, to hold a screw in place with one hand while driving it with a screw driver held in the other hand. The reason for this difficulty is the lack of access space for the hand holding the screw. Various devices have been developed which will secure a screw on the head of a screw driver, thereby obviating the necessity of holding the screw in place with one hand while starting it in its hole. Each of these devices releasably held the screw in place and could be withdrawn from the screw with a minimum of difficulty after the screw had been started in its hole.

The screw starter of this invention is used specifically with screws having a cross-cut or cruciform slot in their heads. The Phillips head screw is the most common example of a screw of the aforementioned type. However, the screw starter of this invention can be used with any screw having a cross-cut slot.

It is therefore an object of this invention to provide a novel screw starter for screws having cross-cut slots.

It is another object of this invention to provide a screw starter that is simple in construction and durable in use.

It is a further object of this invention to provide a screw starter that is efficiently and easily used.

These and other objects are accomplished by providing a starter for a screw having cross-cut slots in its head comprising a shank portion and a bit portion formed on one end thereof, said bit portion comprising two divergent angular wings secured on said shank portion, said wings adapted to be releasably secured in said slots, and a sleeve slidably mounted over said shank portion and said bit portion whereby the sliding of said sleeve in the direction of said bit portion will cause said angular wings to converge.

Other objects and many of the attendant advantages of this invention will be readily appreciated as the same becomes better understood by reference to the following detailed description when considered in connection with the accompanying drawings wherein:

FIG. 1 is an exploded perspective view illustrating a screw having cross-cut slots in its head and the starter of this invention immediately prior to insertion in said slots.

FIG. 2 is a perspective view illustrating the screw releasably secured on the starter of this invention.

FIG. 3 is a sectional view taken along the line 3—3 of FIG. 1.

FIG. 4 is a sectional view taken along the line 4—4 of FIG. 2, with the screw removed for the sake of simplicity.

FIG. 5 is an enlarged front elevational view taken in the direction of arrows 5—5 of FIG. 3.

FIG. 6 is an enlarged front elevational view taken in the direction of arrows 6—6 of FIG. 4.

FIG. 7 is an enlarged sectional view taken along the line 7—7 of FIG. 3.

Referring now in greater detail to the various figures of the drawings wherein similar reference characters refer to similar parts, a Phillips head screw starter embodying the present invention is generally shown at 10 in FIG. 1.

Device 10 basically comprises a shank 12, a bit portion 14 secured in said shank, and a sleeve 16 slidably mounted over said shank and said bit portion.

Shank 12 basically comprises elongated rod 18 and insert 20. Rod 18 is provided with an axial bore 22 at one end thereof in which insert 20 is secured. This securement may be made by a pressed fit or other means known to the art. A major portion of the length of rod 18 is provided with a knurled surface 24. This surface aids in gripping and turning the shank during the insertion of a screw.

Bit portion 14 is secured in insert 20. This portion basically comprises a pair of resilient wings 26. As seen in FIG. 5, each wing is V-shaped in cross-section, and in the embodiment shown, the angle between the two legs of the V is 90°. As further seen in FIG. 5, the two V's open in opposite directions from each other. Thus, in the embodiment shown each leg of a wing is 90° out of phase with an adjacent leg. Of course, it is to be understood, that in cases wherein the screw slots are at different angles than 90°, the legs of each wing can be varied accordingly.

Each wing is formed from a square piece of resilient metal. It is first bent to form the V-shape shown in FIG. 5. It is then cut diagonally from the front tip to form tapered front edges 28 (FIGS. 3 and 4). These tapered front edges are of generally the same taper as the tapered walls of the slots of screws having cross-cut slotted heads. Proceeding rearwardly from tapered edges 28, each wing is cut downwardly at a slight taper leaving a slightly raised shoulder 30, the purpose of which will be explained hereinafter. The remainder of each wing is cut substantially horizontally back. Thereafter, each wing is bent radially along its lower edge 32. Thus, when the wings are secured in insert 20, the two wings will be radially divergent from each other, as shown in FIGS. 4 and 6. Although the formation of the wings has been described as a series of individual steps, it is to be understood that the wings can be formed, cut and bent in a continuous or single operation by suitable dies.

After the wings 26 are formed, they are forced into V-shaped slots in insert 20. Since insert 20 is made of a resilient material, such as spring steel, the wings will be held securely in place. Sometimes it may be necessary to additionally crimp the insert 20 to insure complete securement of the wings.

Sleeve 16 is slidably telescoped over bit portion 14 and insert 20. As seen in FIGS. 3 and 4, sleeve 16 is longitudinally movable from shoulder 30 at one extreme to edge 34 of rod 18 at the other extreme. As seen in FIGS. 3 and 4, sleeve 20 is basically tubular and has a peripheral lip 36 which extends toward the interior thereof. A knurled collar 38, which is integral with sleeve 16, extends circumferentially around a portion of the sleeve.

The screw starter of this invention can be used with any screw having cross-cut slots in its head. In the embodiment shown in FIG. 1 screw 40 has a first slot 42 and a second slot 44 extending perpendicularly thereto. An enlarged recess 46 is formed at the intersection of the two slots. The interior of each of the slots tapers inwardly toward the base of recess 46. Examples of screws on which this invention may be used are shown in Patents No. 2,046,837, 2,474,994, and 2,507,231. In use, sleeve 16 is pushed forward until peripheral lip 36 abuts shoulder 30, thereby depressing divergent wings 26 to their greatest extent, as shown in FIGS. 1, 3 and 5. With the wings in this depressed condition, they are inserted in screw 40 with one leg of each wing being received in a corresponding leg of one of the slots. Thereafter, sleeve 16 is pulled rearwardly, thereby allowing wings 26 to diverge again to the condition shown in FIGS. 4 and 6. However, with the screw in place, the divergency of the wings is limited by the extent of the screw slots. Thus, as the wings expand, they will resiliently grip the outer walls of the slots, thereby securing the screw in place. The sliding back and forth of sleeve 16 is facilitated by knurled collar 38.

With the screw held resiliently in place, it is then a relatively easy matter to start it in its hole. This is accomplished by merely grasping knurled portion 24 of shank 12, placing the screw adjacent the hole, and rotating the knurled portion 24 in the direction of arrow 48 while inserting the screw. Thus, the screw can be inserted in a relatively inaccessible hole while using only one hand.

After the screw has been started in the hole, the screw starter of this invention is removed. This can be accomplished by pushing sleeve 16 forward, thereby compressing divergent wings 26 and releasing their resilient grip on the slots. Alternatively, starter 10 may be removed by merely pulling it outwardly from the screw. Since the screw is threadedly secured in place and the wings resiliently engaged, there is no fear of the screw's becoming disengaged upon the removal of the starter. If desired, the screw starter may also be used as a screw driver after the screw has been inserted in the hole. Thus, the screw can be completely driven in place with screw starter 10. Otherwise, after the starter has been removed, a conventional Phillips head screw driver can be used to finish the insertion.

The starter of this invention may be made from numerous materials. Rod 18 may comprise any material having the strength and hardness characteristics to permit the transmission of torque to bit portion 14 without distorting the rod. For instance, wood, metal or plastic may be used. Both steel and aluminum have been found to be effective.

Likewise, insert 20 may be made of any material which will securely hold bit portion 14 and can be secured in rod 18. Spring steels have been found most effective for this use. A material which has given excellent results is annealed 10–65 spring steel wire.

With respect to wings 26, any material which is sufficiently resilient to hold a screw in place may be used. A material which has given excellent results is specially tempered 65–80 carbon spring steel. This tempering treatment comprises subjecting the spring steel to a temperature of 1400° to 1500° F. for 15 to 20 minutes. The steel is then drawn to get the proper temper. At this temper, the Rockwell hardness is approximately 45 to 47. Although this material has proved to be particularly effective, other known spring steels may also be used.

Obviously many modifications and variations of the present invention are possible in the light of the above teachings. For instance, means other than shoulder 30 may be provided for limiting the movement of sleeve 16. Thus, a vertically extending pin may be secured in insert 20. This pin would protrude through a longitudinally extending slot in sleeve 38. Thus, the movement of sleeve 38 could be limited by the respective ends of the slot engaging the pin. The use of the stop means, whether a pin and slot or a raised shoulder, is necessary to prevent the sleeve 16 from being slipped over the divergent wings 26 when closing them.

It is therefore to be understood that within the scope of the appended claims, the invention may be practiced otherwise than as specifically described.

What is claimed as the invention is:

1. A starter for a screw having cross-cut slots in its head comprising a shank portion and a bit portion formed on one end thereof, said bit portion comprising two divergent angular wings secured in said shank portion, said wings having at least the front portions thereof V-shaped in cross section, whereby said wings are adapted to be releasably secured in said slots, and a sleeve slidably mounted over said shank portion and said bit portion whereby the sliding of said sleeve in the direction of said bit portion will cause said angular wings to converge.

2. The invention of claim 1 wherein each of said angular wings comprises a resilient material.

3. The invention of claim 2 wherein said resilient material is spring steel.

4. The invention of claim 1 wherein each of said angular wings includes tapered front edges.

5. The invention of claim 1 and further including means for limiting the distance along which said sleeve may be slid.

6. The invention of claim 5 wherein said limiting means comprises a raised shoulder on each of said wings.

7. The invention of claim 1 wherein said shank portion includes an insert at one end thereof in which said angular wings are secured.

8. The invention of claim 1 wherein said shank portion has means on its surface to aid in gripping said portion.

9. The invention of claim 8 wherein said gripping means comprises a knurled surface.

10. The invention of claim 1 and further including a collar having a knurled surface on said sleeve to aid in gripping and sliding said sleeve.

11. A starter for a screw having cross-cut slots in its head comprising a shank portion and a bit portion formed on one end thereof, said bit portion comprising two divergent angular wings secured in said shank portion, said wings adapted to be releasably secured in said slots, and a sleeve slidably mounted over said shank portion and said bit portion whereby the sliding of said sleeve in the direction of said bit portion will cause said angular wings to converge, each of said angular wings being V-shaped in cross-section and formed of a resilient material, and each of said wings having tapered front edges which terminate in slightly raised shoulders to limit the distance through which said sleeve may be slid.

12. The invention of claim 11 wherein said sleeve is tubular and includes an inwardly extending peripheral lip at the front edge thereof, said lip adapted to engage said raised shoulders upon the sliding of said sleeve in the direction of said bit portion.

References Cited by the Examiner

UNITED STATES PATENTS

| | | |
|---|---|---|
| 855,280 | 5/07 | Campbell. |
| 2,559,206 | 7/51 | Wienholtz. |
| 2,775,913 | 1/57 | Deliso. |

FOREIGN PATENTS

| | | |
|---|---|---|
| 1,013,588 | 8/57 | Germany. |

WILLIAM FELDMAN, *Primary Examiner.*

MILTON S. MEHR, *Examiner.*